United States Patent [19]

Benjamin et al.

[11] Patent Number: 5,368,417
[45] Date of Patent: Nov. 29, 1994

[54] CAPTIVE CARRIER FOR A TRANSPORT TUBE SYSTEM

[75] Inventors: Fred W. Benjamin, Mahwah; Edward R. Gralinski, Columbia; Robert D. Smith, Jr., Wantage; Victor J. Vogel, Oak Ridge, all of N.J.

[73] Assignee: Mosler Inc., Wayne, N.J.

[21] Appl. No.: 69,875

[22] Filed: May 28, 1993

[51] Int. Cl.⁵ .............................. B65G 51/26
[52] U.S. Cl. .................... 406/111; 406/188; 406/190; 232/43.1; 220/345
[58] Field of Search ............ 406/111, 188, 190, 186, 406/187, 189; 232/7, 15, 16, 43.1; 220/345, 349

[56] References Cited

U.S. PATENT DOCUMENTS

| | | |
|---|---|---|
| 977,083 | 11/1910 | Emerson .............. 406/190 |
| 1,039,394 | 9/1912 | Herz .................... 406/188 |
| 1,218,380 | 3/1917 | Dowie .............. 220/345 X |
| 1,638,047 | 8/1927 | Maclaren ........... 406/187 X |
| 3,201,064 | 8/1965 | Dagle et al. . |
| 3,482,801 | 12/1969 | Leontas . |
| 3,506,216 | 4/1970 | Delamater . |
| 3,964,693 | 6/1976 | Thomas . |
| 4,362,443 | 12/1982 | Mallory et al. . |
| 4,436,456 | 3/1984 | Thomas . |
| 4,753,387 | 6/1988 | Fee et al. . |
| 4,792,263 | 12/1988 | Podoll . |
| 4,820,086 | 4/1989 | Kieronski . |
| 4,862,360 | 8/1989 | Kimura et al. . |
| 4,971,481 | 11/1990 | Foreman . |
| 5,108,233 | 4/1992 | Bolz et al. . |
| 5,131,792 | 7/1992 | Grosswiller et al. . |

FOREIGN PATENT DOCUMENTS 1143524 10/1957 France .................. 220/345
2187157 9/1987 United Kingdom .

Primary Examiner—David M. Mitchell
Assistant Examiner—Gary C. Hoge
Attorney, Agent, or Firm—Wood, Herron & Evans

[57] ABSTRACT

A captive carrier for a heavy payload system having end caps rigidly connected thereto. Each end cap has a sliding cover mounted in an outer most surface thereof, Restraining means on the cover restrain the cover from motion in response to the captive carrier tilting outwardly toward the user thereby opening the top of the carrier. The end caps and covers have a curved profile that corresponds to the curvature of the pivoting motion of the top of the carrier, The carrier further includes a wear strip mounted on one side which is directed vertically downward when the carrier is moving in a horizontal direction.

10 Claims, 6 Drawing Sheets

CAPTIVE CARRIER FOR A TRANSPORT TUBE SYSTEM

BACKGROUND OF THE INVENTION

1. Field of the Invention

The present invention relates to fluid current conveyors and, more particularly, to a captive multilateral carrier for a pneumatic transport tube system.

2. Discussion of the Related Art

Pneumatic transport tube systems transfer materials between stations by moving a carrier inside a transport tube. The carrier is moved by creating a pneumatic pressure drop across the carrier which creates a force on one or the other end of the carrier thereby moving the carrier through the transport tube. More common transport tube systems are used in banks in which a cylindrical removable carrier is used to transfer materials between a teller terminal inside the bank and a customer terminal accessible by a customer in a vehicle. Captive carrier pneumatic transport systems are typically used for heavy payloads. Since the carrier and transport tube are a larger size for the heavy payload, the transport tube is run overhead instead of underground which is common with smaller systems.

A heavy payload may be up to 25 lbs. (11.5 Kg), and the carrier itself may weight 16 lbs (7.5 Kg). One example of a heavy payload captive carrier system is shown in U.S. Pat. No. 5,131,792, which discloses a cylindrical captive carrier. The top of the carrier is automatically removed and held within the terminal unit and the carrier is then pivoted for presentation to the user. That design requires a relatively complex mechanism to remove the end cover of the carrier, store it and reinstall the end cover after the carrier is pivoted back into the terminal unit.

Another example of a heavy payload captive carrier is disclosed in U.S. Pat. No. 4,792,263. Here, a rectangular captive carrier is disclosed comprising a hollow rectangular body, the ends of which are closed by sliding end plates. The carrier rotates 90° as it moves between the two terminal units. That rotation results in the carrier being opened with two different mechanisms depending on which terminal unit is being used. For example, at the customer terminal unit, the carrier is pivoted outwardly toward the customer; and then, a sliding cover on the terminal unit slides an end plate parallel to the major axis of the end plate thereby opening the carrier for use by the customer. At the teller terminal, the carrier is received in a sliding drawer and slides outward toward the teller in a direction parallel to the major axis of the end plate. The end plate is locked in position, and therefore, the carrier is opened as it slides out toward the teller. The end plates are positively locked in a closed position when the carrier is traveling between the terminal units. A mechanism within the terminal unit releases the end plate locks as the carrier comes to rest in the terminal unit.

The above '263 design has the disadvantage of requiring a two-step opening procedure for the carrier at the customer terminal unit which is relatively slow and complicated. Further, the rectangular profile of the carrier results in a 90° change of orientation as the carrier moves between the customer and teller terminal units. Finally, the locking mechanism for the carrier end plates is complicated with many moving parts and has a risk of interference from debris.

SUMMARY OF THE INVENTION

To overcome the disadvantages of existing captive carriers, the present invention provides a captive multilateral carrier that has a simple and reliable mechanism for opening and closing the ends of the carrier.

According to the principles of the present invention and in accordance with the presently preferred embodiment, a captive carrier having a square hollow body with two open ends has two end caps fixed to the open ends. An end cap cover is slidably mounted proximate an outer surface of each end cap. At both the customer and teller terminal units, the carrier is pivoted for presentation to the user, and the end cap cover on the upper end cap is restricted from motion thereby opening the carrier during the pivoting motion. The end caps and end cap covers have a curved profile corresponding approximately to the arc of the pivoting motion. The carrier includes a retaining clip spring for applying a biasing force to restrain sliding motion of the cover toward an open position. The carrier has a bearing strip that contacts a bottom surface of the transport tube when the carrier is moving in a horizontal direction between customer and teller terminals.

The carrier is received by a bin which is pivotally mounted in a bin support within each of the terminals. After the carrier is received in a bin, pins mounted on the bin support are moved into engagement with the end cap cover on the upper end of the carrier. The carrier and bin are then pivoted outward toward the user. The pins hold the end cap cover stationary during the pivoting motion thereby opening the carrier for access by the user. Pivoting the bin and carrier back into the terminal closes the end cap cover over the upper end of the carrier. After the carrier and bin have returned to their original position, the pins are removed from their engagement with the cover; and the carrier is transported in the transport tube to the other terminal.

An advantage of the present invention is that the carrier construction is simplified by rigidly connecting the carrier body to the end caps in which end cap covers are slidably located. The square cross-sectional configuration permits the same presentation at both the customer and teller terminals thereby permitting a simple and reliable carrier motion to simultaneously present and open the carrier. The carrier cover is maintained in a closed position by a clip spring. The only moving parts are the sliding end cap covers, and therefore the carrier in conjunction with the terminals provides a simple and reliable mechanism.

These and other objects and advantages of the present invention shall be made apparent from the accompanying drawings and the description thereof.

DETAILED DESCRIPTION OF THE INVENTION

Figure 1:
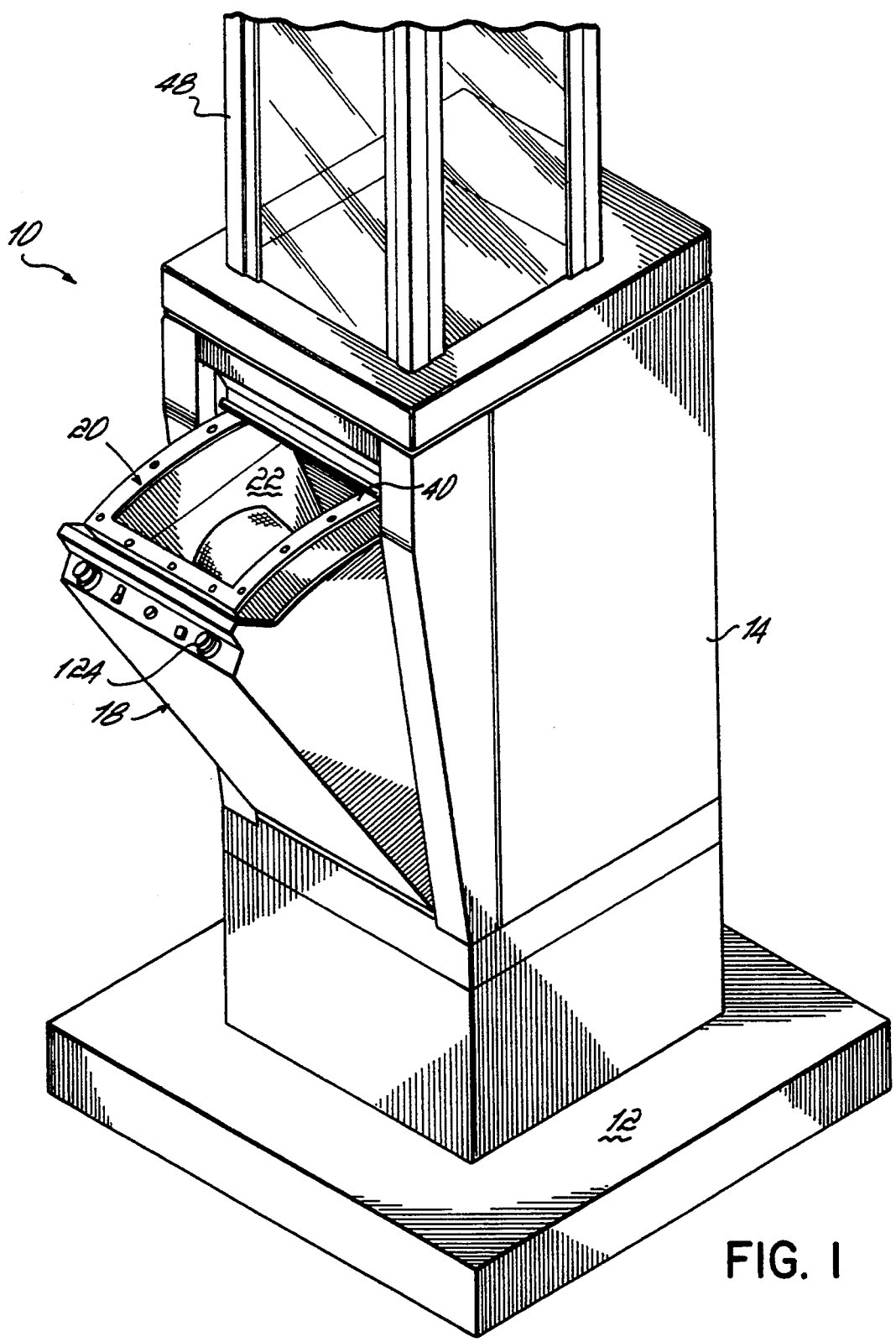
FIG. 1 is a perspective front view of a terminal unit with the captive carrier and bin illustrated in an open position.
Figure 2:
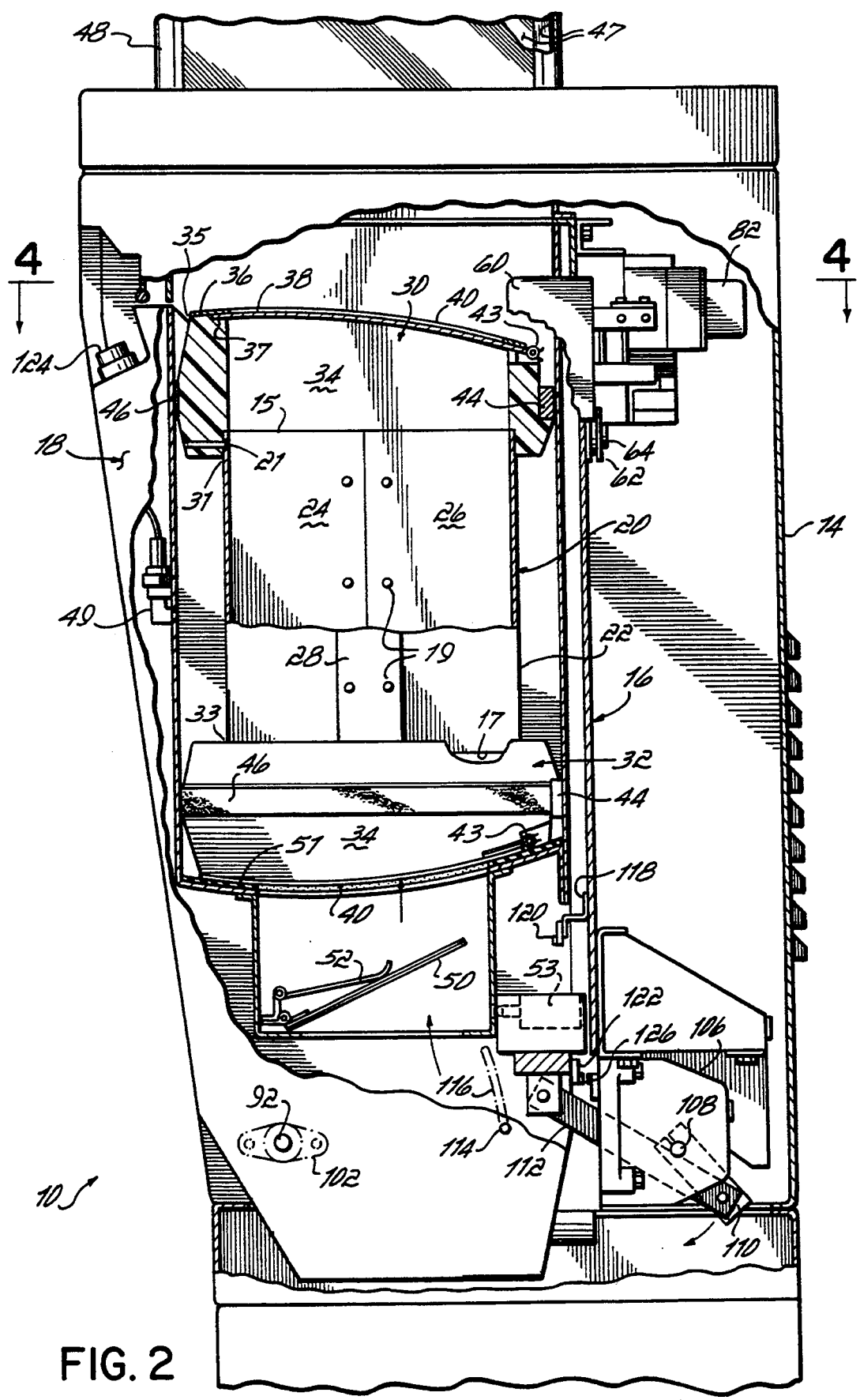
FIG. 2 is a partial cross-sectional side view of the terminal unit illustrating the carrier and the bin in a closed position.
Figure 3:
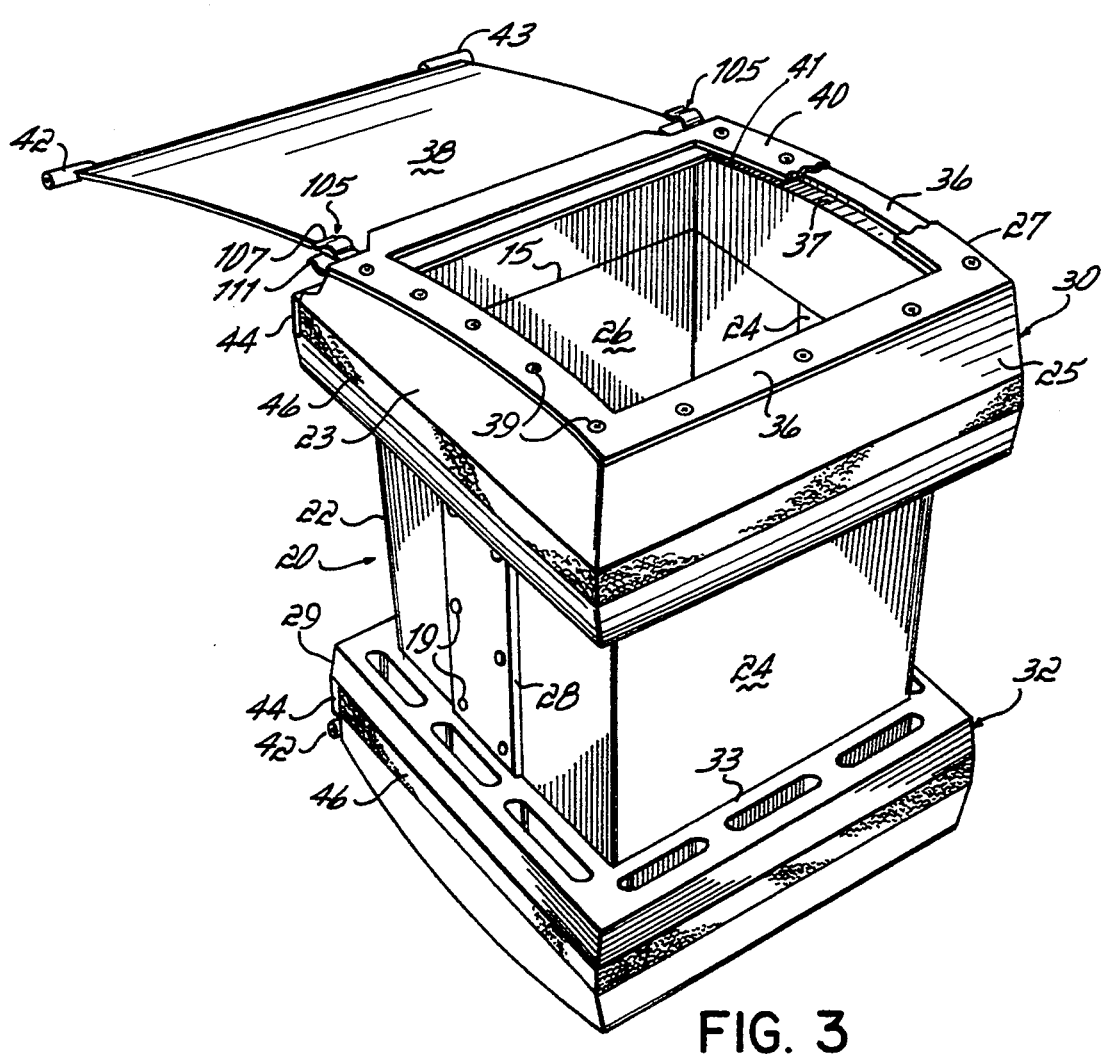
FIG. 3 is a perspective view of the carrier outside of the terminal unit

Referring to FIGS. 1–3, a terminal unit 10 is comprised of a terminal base 12 supporting an outer housing 14. Within the outer housing 14, bin 18 is pivotally mounted in a bin support 16. The bin 18 receives a carrier 20 which remains captive in the bin 18. The carrier 20 is comprised of a carrier body 22 which is a square hollow member with four sides and two open ends 15, 17. The carrier body 22 is formed by bringing the open ends of two U-shaped pieces 24 and 26 together, and two seam plates 28 are bolted or otherwise rigidly connected across the resulting two joints with screws 19. Two end caps 30 and 32 have respective first open ends 31 and 33 and are connected to the open ends 15 and 17, respectively, of the carrier body 22 by screws, bolts or other fasteners 21.

Figure 4:
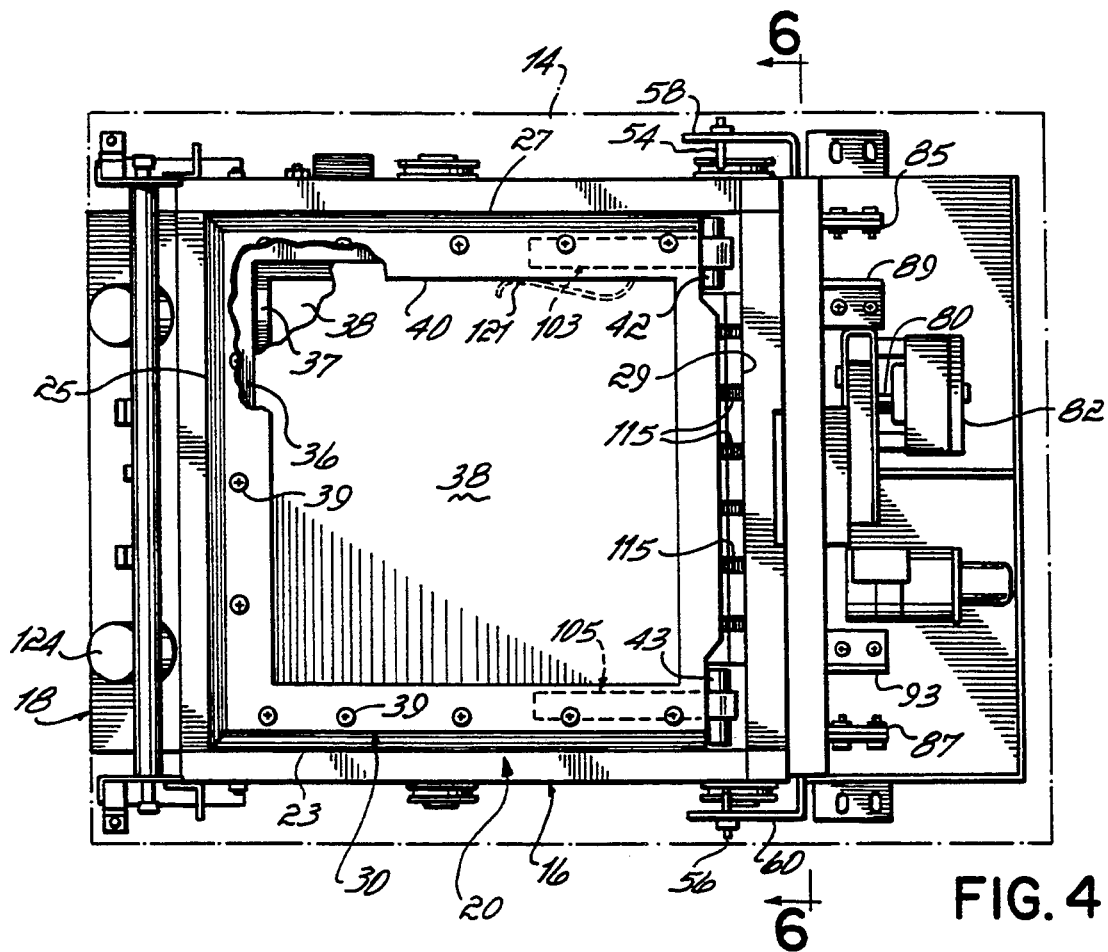
FIG. 4 is a cross-sectional view taken along lines 4—4 of FIG. 2 and illustrating a top view of the bin.
Figure 9:
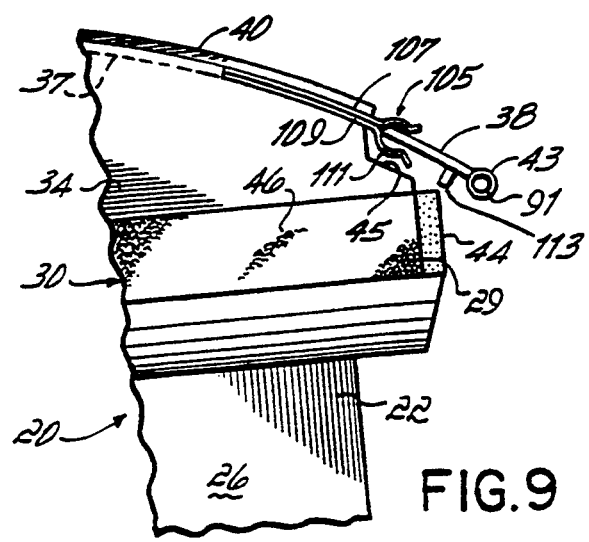
FIG. 9 is an enlarged view of the door clips.

The construction and operation of the end caps 30 and 32 are identical, and therefore only the detailed construction of end cap 30 will be described. End cap 30 has a head 34 which preferably has a square cross-section defined by sides 23, 25, 27 and 29 (FIG. 4). End cap 30 is typically an injection molded piece of LEXAN. Proximate an outwardly directed surface 36 at a second end 35 of the head 34 is a molded a peripheral stepped surface 37 extending around the three sides 2, 25, 27 and intersecting a notched edge 45 on a fourth side 29 (FIG. 9). The peripheral stepped surface 37 receives a cover 38 thereon. As shown in FIG. 4, cover frame 40 is then attached to the periphery of the outer surface 36 of the head 34. The cover frame 40 is attached by threaded fasteners 39, and preferably, mating threaded steel inserts are plugged into the periphery of the outer surface 36 of the LEXAN head 34. The cover frame 40 extends around the periphery of the head 34 and over the stepped surface 37 of the second end 35 of the head 34 thereby containing three of four side edges of the cover 38 in a groove 41 within the head but permitting the cover 38 to slide between the peripheral step 37 and the cover frame 40. The cover 38 slides outward from and in a direction generally perpendicular to the side 29 of the second end 35 of the head 34. The cover 38 includes ears 42, 43 attached to the ends of a fourth side edge which slides outwardly from the side 29 of the head 34. The ears 42, 43 are cylindrical tubes with a longitudinal cylindrical opening. Attached to the rear surface of the head 34 is a wear strip 44 made of an ultra high molecular grade polyethylene. Extending laterally along the other sides of the head 34 at the same longitudinal position of the wear strip 44, is VELCRO ® tape 46, see end cap 32.

FIG. 2 illustrates the carrier 20 in the terminal unit 10 after it is received from or prior to being sent to another terminal in the pneumatic transport tube system. The transport tube 48 has a square cross-section mating with the square cross-section of the end caps 30, 32 at the location of the wear strip 44. The wear strip 44 and VELCRO ® tape 46 are in contact with the inside surfaces 47 of the transport tube 48 thereby forming a pneumatic seal between the carrier 20 and the transport tube 48. As is well known, blowers located remotely from the terminal unit 10 are used to create a negative pressure in the transport tube 48 above the carrier 20. That negative pressure, or vacuum, is effective to pull the carrier 20 out of the bin 18 and into sliding contact with the inside walls of the transport tube 48. Simultaneously, a valve 50 is released from its closed position by a solenoid 53, and the negative pneumatic pressure created below the carrier 20 by its vertically upward motion will pull valve 50 open against a spring 52 which provides a biasing force to hold valve 50 in a closed position.

Typically, the carrier 20 is moved through a vertical section of transport tube 48 across a horizontal section. When the carrier is moving in the horizontal section of the transport tube, the carrier is positioned such that the wear strips 44 at both ends of the carrier are bearing against the lower horizontal surface within the transport tube (not shown). Consequently, the VELCRO ® tape 46 does not experience the load of the carrier; and by contacting the interior walls of the transport tube, the VELCRO ® tape is effective to provide a pneumatic seal between the tape and the transport tube 48. At the end of the horizontal section, the carrier 20 moves vertically downward in a vertical transport tube section located above another terminal unit identical to the terminal unit 10. However, the carrier will be inverted and the end cap 32 will be located at the top of the carrier 20 to be presented to the user, and the end cap 30 will be on the bottom of the carrier. In a similar manner, the carrier 20 moves in a vertically downward direction through transport tube 48 to be received by the terminal 10. During that motion, the valve 50 remains closed; and the carrier free falls in a vertically downward direction within the vertical transport tube 48. The vertically downward motion of the carrier 20 is retarded by the air trapped beneath the carrier 20 and above the closed valve 50. The bottom of the bin 18 has shock absorbing strips 51 which cushion the landing of the carrier 20 in the bin 18. The shock absorbing strips 51 may be constructed of silicon pads which are approximately 0.5 inches (130 mm) thick and are bonded to the bottom of the bin. A photo electric sensor 49 located in the front wall of bin 78 senses the presence of carrier 20 in the bin.

Figure 5:
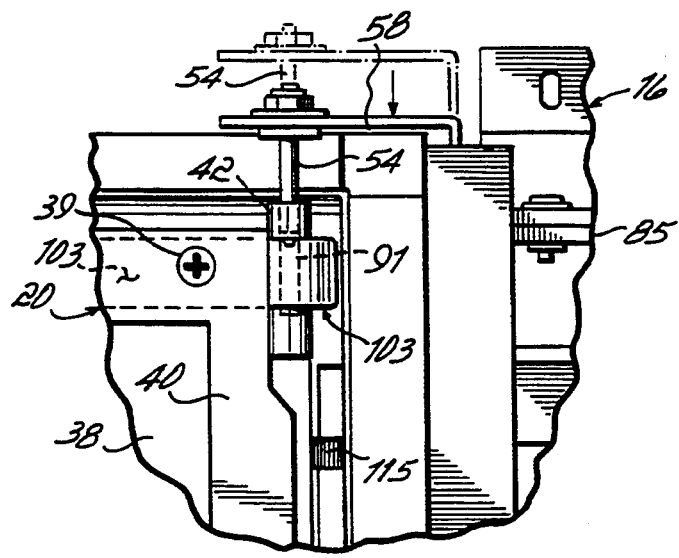
FIG. 5 is an enlarged view illustrating the operation of the shot pins which restrict motion of the cover when the carrier is moved to its open position.
Figure 6:
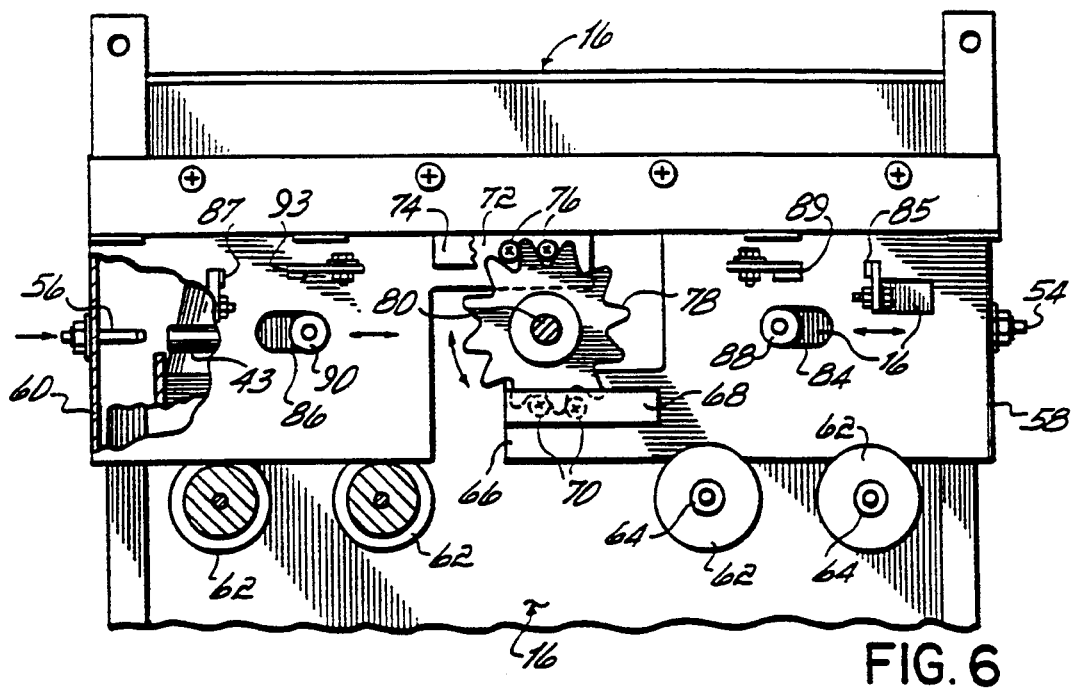
FIG. 6 is a cross-sectional view taken along the lines 6—6 of FIG. 4 and illustrating the operation of the shot pin bracket arms.

Referring to FIGS. 4, 5, and 6, after the carrier 20 has come to rest within the bin 18 but before the carrier 20 is pivoted to a presentation position to the user, the ears 42 and 43 of the cover 38 functioning as engagement elements are engaged by shot pins 54 and 56 to hold, that is, restrict motion of the cover 38. The shot pins 54, 56 are mounted to respective brackets 58 and 60. As shown in FIG. 6, the brackets 58 and 60 are mounted on and extend across the rear of the bin support 16. The brackets 58 and 60 have a right angle shape and bend around to the sides to the bin support 16 so that the brackets are located opposite each other close to the rear side of the bin support 16. As shown in FIG. 6, the brackets 58 and 60 are supported by wheels 62 secured to the bin support 16 by shoulder screws 64. The tightened shoulder screws 64 permit the wheels 62 to freely rotate. The bracket 58 has a lower arm 66 extending therefrom. Further, screws 70 are fastened to the lower arm 66 and a plate 68 has U-shaped ends which are welded to the lower arm 66. The plate 68 is also welded to the tops of the screws 70 such that there are pockets or spaces between the screws 70, plate 68 and the lower arm 66. The bracket 60 has an upper arm 72 extending therefrom with screws fastened to the upper arm 72. A plate 72 is welded to the tops of the screws 76 and has ends welded to the upper arm 72 to form spaces between the studs 76, upper arm 72 and the plate 74. The spaces between the upper and lower arms 72, 66, their respective plates 74, 68 and screws 76,70, are effective to provide upper and lower racks which are engaged by a pinion 78 mounted on a drive shaft 80 of an electric stall motor 82 (FIG. 4). The brackets 58 and 60 further have respective slots 84 and 86 which capture shoulder screws 88 and 90, respectively. The slots 84 and 86 and shoulders screws 88 and 90 are effective to limit the motion of the brackets 58 and 60 as shown in FIG. 5.

When the carrier 20 is positioned within the bin 18, the electric stall motor is commanded to move the pinion 78 clockwise, as viewed in FIG. 6. Clockwise rotation of the pinion 78 will move the brackets 58 and 60 toward each other which, as shown in FIG. 4, will cause the shot pins 54 and 56 to enter the internal bores 91 of the tubular ears 42 and 43 connected to the cover 38. The rotation of the pinion continues until the outermost ends of the slots 84 and 86 engage the outwardly directed surfaces of the shoulder screws 88 and 90. The stall motor is effective to hold the brackets 58, 60 in that position. Magnetic proximity sensors 89 and 93 are connected to the brackets 58 and 60, respectively. Magnetic proximity actuators 89 and 93 are connected to the bin support 16. The magnetic proximity sensors and actuators are mounted with respect to each other to produce proximity signals in response to each of the brackets 58 and 60 moving their respective shot pins 54 and 56 into engagement with the ears 42, 43 of the cover 38. The proximity signals may be used as part of a cycle control to provide permission for the carrier and bin support to pivot to the presentation position.

Figure 7:
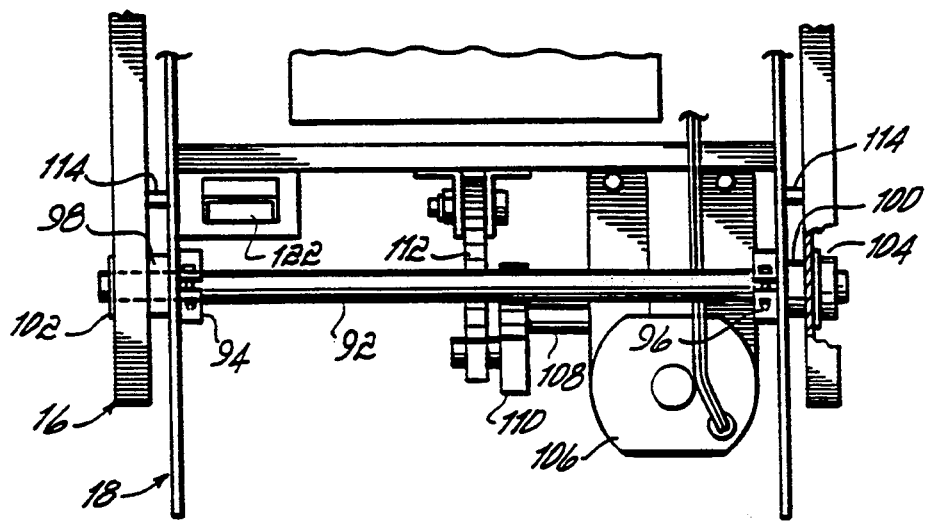
FIG. 7 is a view illustrating the pivoting mechanism of the bin relative to the bin support.
Figure 8:
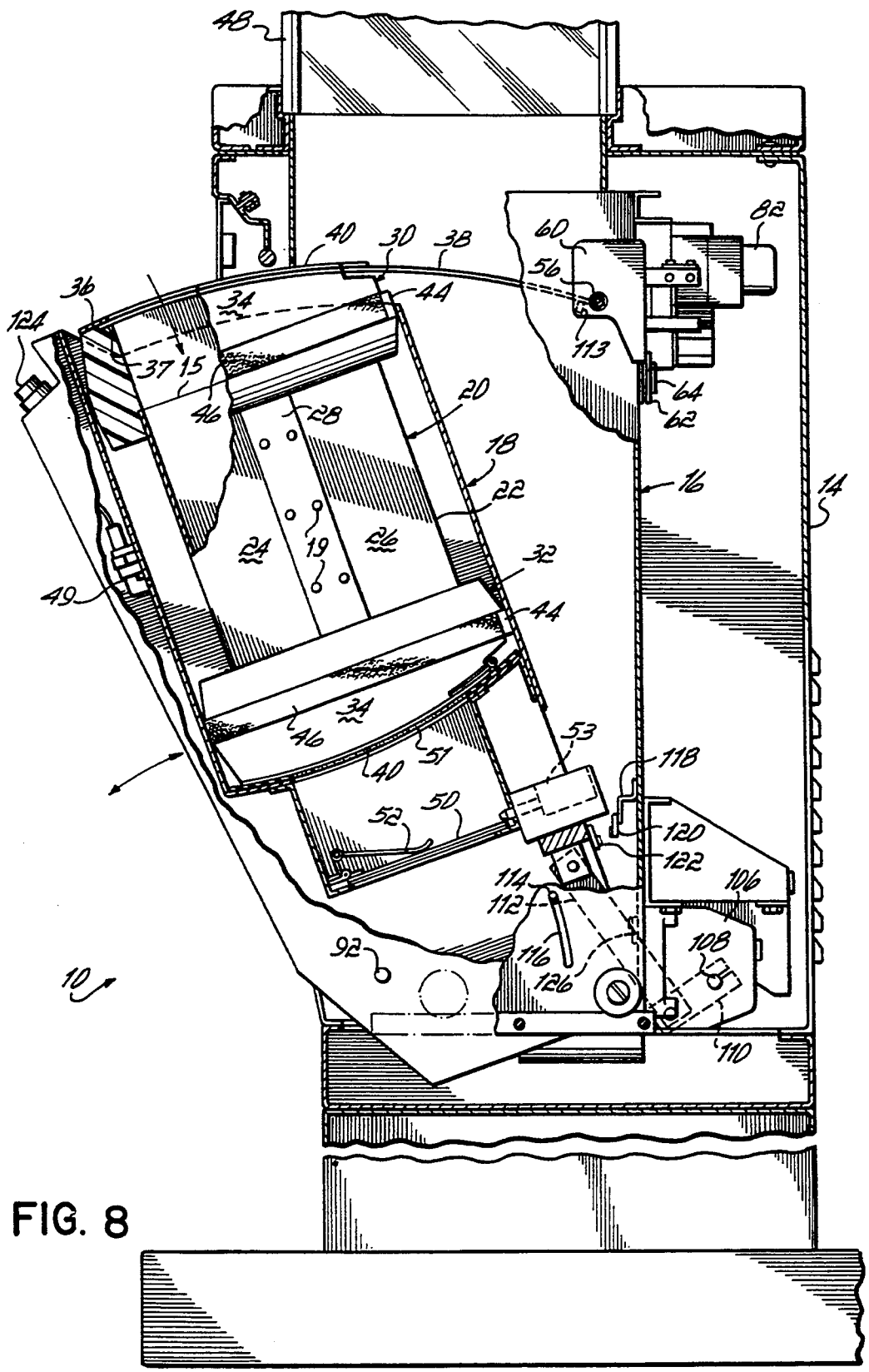
FIG. 8 is a partial cross-sectional side view of the terminal unit illustrating the carrier and the bin in an open position.

As shown in FIG. 7, the bin 18 is clamped to a pivot shaft 92 by means of collar clamps 94 and 96. The pivot shaft 92 passes through ultra-high molecular weight bushings 98 and 100 mounted between the bin 18 and bin support 16. The ends of the shaft 92 are supported in flanged bearings 102 and 104 mounted on the bin support 16. As shown in FIGS. 2, 7 and 8, an electric gear motor 106 is mounted on the bin support 16 and has an output drive shaft 108 tightly connected to one end of an actuator arm 110. The other end of actuator arm 110 is pivotally connected to one end of lift arm 112. The opposite end of lift arm 112 is pivotally connected to the bin 18 proximate its back edge. After the shot pins have engaged the ears 42, 43 of the cover 38, as previously described, the gear motor 106 is energized to move its output shaft in a clockwise direction as viewed in FIG. 8. Clockwise rotation of the output drive shaft 108 is effective to rotate bin 18, pivot shaft 92 connected thereto and carrier 20 contained therein, with respect to the flanged bearings 102 and 104. That rotation effectively results in the bin 18 and carrier 20 pivoting about the central longitudinal axis of the pivot shaft 92 and toward the front side of the terminal unit 10. The shot pins 54 and 56 of the restricting mechanism engage in the ears 42 and 43 of the cover 38, and hold the cover 38 in a stationary position and the bin 18 and carrier 20 rotate relative to the cover 38.

Cover retainers 103 and 105 are secured under the cover frame 40 to receive the ears 42 and 43, respectively, of cover 38, The cover retainers 103 and 105 restrain the cover 38 from motion with respect to head 34 when the carrier is moving through the transport tube 48. The cover retainers 103 and 105 are identical in construction and only the details of the cover retainer 105 will be described. Referring to FIG. 9, the cover retainer 105 is comprised of opposed spring steel clips 107 and 109, and each clip has a radius 111 at one end which is formed to conform to the radius of the ears 42, 43. The cover retainer 105 is effective to restrain motion of the cover 38 but does not lock the cover against motion. The pivoting force of the carrier 20 and bin 18 overcomes the restraining forces of the spring clips 107, 109 which tend to hold the cover 38 in its closed position. Therefore, as the bin and carrier pivot, that is, tilt outwardly toward the user, the cover 38 is held stationary relative to the pivoting carrier, and the top of the carrier 20 is opened.

As shown in FIG. 2, the bin 18 has a pin 114 which is located in a slot 116 of the bin support 16. The bin 18 and carrier 20 continue the outwardly pivoting motion until the pin 114 engages an upper end of the slot 116 at which point the carrier is in a presentation position as shown in FIGS. 1 and 8. A bracket 118 is mounted on the bin support 16 and has a magnetic proximity sensor 120 connected thereto. The open presentation position of the carrier and bin is detected by the magnetic proximity sensor coacting with the magnetic proximity actuator 122 attached to the bin 18. The user, which may be a customer or teller, removes and/or deposits materials from the carrier 20 or removes or inserts papers from or under the clip 121; and thereafter, the user activates send control 124. The gear motor 106 reverses its rotation, thereby returning the bin and carrier to the send/receive position within the bin support, illustrated in FIG. 2. That position is detected by magnetic proximity actuator 122 being moved adjacent a magnetic proximity sensor 126 mounted on the bin support 16.

Referring to FIG. 8, as the carrier 20 and bin support 16 are pivoted back into the bin support 18, the stationary cover 38 is slid over the top of the end cap thereby closing the carrier. The ears 42, 43 of the cover are pushed back into the cover retainers 103 and 105, respectively, thereby restraining the cover from motion. As the cover moves over the end of the carrier 20, a row of studs I 13 are located on the cover 38 such that they engage slots 115 (FIG. 4) of the end cap. The row of studs help clear the back edge of the carrier of any object that may be interfering with the cover 38 sliding to its closed position.

When the bin 18 is returned to the position illustrated in FIG. 2, the electric stall motor 82 is commanded to reverse its direction of rotation to a counterclockwise rotation as viewed from FIG. 6. That rotation is effective to move the brackets 58 and 60 in opposite directions away from each other thereby causing the shot pins 54 and 56 to disengage from the ears 42 and 43 of the cover 38. When the innermost edges of the slots 84 and 86 contact the inner directed sides of the shoulder screws 88 and 90, the motion of brackets 58 and 60 stops; and the stall operation of the electric stall motor 82 holds the brackets in that position. The carrier 20 is now free to be sent back up through the transport tube 48 to the other terminal unit.

To minimize interference of the bin 18 and carrier 20 with the other elements of the terminal unit 10, the outer surface 36 of the end cap 30 has a curvature that approximates the arc of motion of a point on the outer surface resulting from the pivoting action of the bin 18 and carrier 22. The curvature of the outer surface 36 of the carrier 20 is duplicated in the cover 38 and cover frame 40. The carrier 32 has an identical curvature.

While the present invention has been illustrated by the description of embodiments, and while the embodiments have been described in some detail, it is not the intention of the applicant to restrict or in any way limit the scope of the appended claims to such detail, Additional advantages and modifications will readily appear to those skilled in the art. For example, the end caps and end cap covers may be made of various other materials. The end cap covers may be restricted from motion by mechanisms other than the shot pins and end cap cover ears. The shot pins may engage holes or loops in the end cap covers. The cover retainer may be comprised of a single spring clip or may engage one or both of the ears. The invention in its broadest aspects is therefore not limited to the specific details shown and described. Accordingly, departures may be made from such details without departing from the spirit or scope of applicant's general inventive concept.

What is claimed is:

1. A carrier slidably contained within a transport tube connected to a terminal, said terminal including a bin for receiving the carrier, the bin and the carrier pivoting about an axis to present the carrier to a user, the carrier comprising:
   a body having two opposed open ends;
   two end caps, each of said end caps having four sides and a first open end rigidly connected to one of said open ends of said body and a second end, each of said end caps including
      a cover having four side edges and slidably mounted within and proximate to said second end of its respective end cap to move in a direction extending outward from one of said four sides of its respective end cap, said cover including an engagement element adapted to be selectively engaged by a restricting mechanism mounted adjacent the bin, whereby motion of said cover is restricted as said carrier moves relative to said cover in response to the bin with the carrier pivoting about the axis thereby opening and closing the carrier.

2. The carrier of claim 1 wherein said second end of each of said end caps and said covers have a curved profile approximating an arc of motion of a point on said second end during the pivoting of the bin with the carrier.

3. The carrier of claim 1 wherein each of said end caps further has a retaining spring clip to restrain motion of said cover relative to a respective one of said end caps.

4. The carrier of claim 3 wherein each of said end caps has a cross-section comprising four mutually perpendicular sides.

5. The carrier of claim 4 wherein said cross-section of each of said end caps is a square.

6. The carrier of claim 4 wherein each of said end caps has a bearing strip on one side providing a primary bearing surface against an internal surface of the transport tube.

7. The carrier of claim 6 wherein each of said end caps further includes a sealing strip contiguous with said bearing strip thereby forming a pneumatic seal between said end caps and the transport tube.

8. The carrier of claim 1 wherein said body has a resilient paper clip on an internal surface therein.

9. A carrier slidably contained within a transport tube connected to a terminal, said terminal including a bin receiving the carrier, the bin with the carrier pivoting about an axis to present the carrier to a user, the carrier comprising:
   a body having two opposed open ends;
   two end caps, each of said end caps having four sides,
      a first open end rigidly connected to one of said open ends of said body and a second end, said second end having a curved profile approximating an arc of motion of a point on said second end during the pivoting of the bin with the carrier and each of said end caps including
      a cover having a curved profile substantially the same as the curved profile of its respective end cap, said cover being slidably mounted within and proximate to said second end of its respective end cap to move in a direction extending outward from one of said four sides of its respective end cap, said cover including an engagement element adapted to be selectively engaged by a restricting mechanism whereby motion of said cover is restricted and said carrier moves relative to said cover in response to the bin with the carrier pivoting about the axis thereby opening and closing the carrier.

10. A transport tube system comprising:
   a transport tube;
   a carrier slidably mounted within said transport tube, said carrier including
      a carrier body having two opposed open ends,
      a pair of end caps, each end cap having four sides and a first open end rigidly connected to one open end of said carrier body and a second open end, and
      a pair of covers, each of said covers having four side edges and slidably mounted proximate to said second open end of one said end caps to move in a direction extending outward from one of said four sides of said one of said end caps, each of said covers including an engagement element and
   a terminal base connected to said transport tube, said terminal base including
      a bin pivotally mounted in said terminal base for receiving the carrier therein,
      means mounted on said terminal base and operably connected to said bin for pivoting said bin and said carrier received therein relative to said terminal base, and
      means mounted in said terminal base for selectively engaging said engagement element on said cover, whereby motion of said cover is restricted and said carrier moves relative to said cover in response to said bin and said carrier pivoting relative to said terminal base, thereby opening and closing said carrier.

* * * * *